J. H. COLLINS.
EYEGLASSES.
APPLICATION FILED OCT. 12, 1906.
963,422.
Patented July 5, 1910.
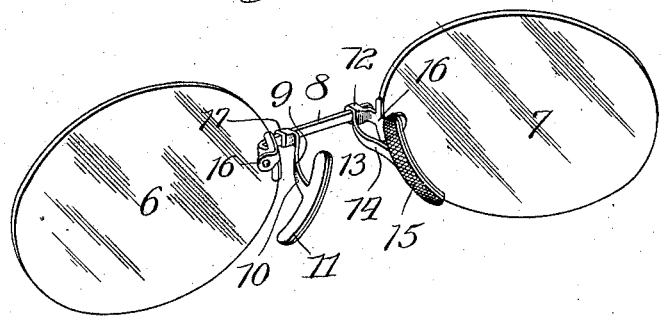
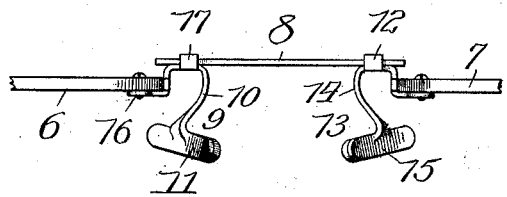
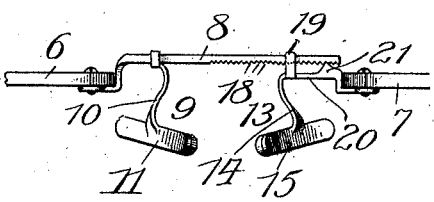
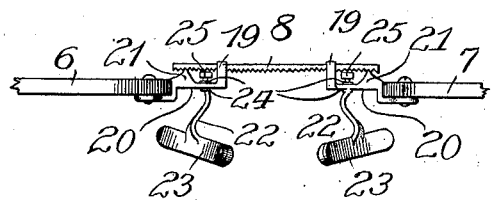
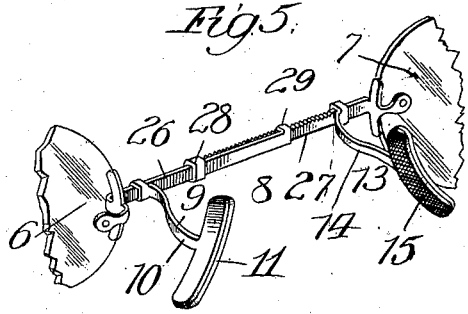
Witnesses:
Inventor:
James H. Collins,
By Dyrenforth, Dyrenforth, Lee & Wiles,
Attys.

UNITED STATES PATENT OFFICE.

JAMES H. COLLINS, OF CHICAGO, ILLINOIS.

EYEGLASSES.

963,422.  Specification of Letters Patent.  Patented July 5, 1910.

Application filed October 12, 1906. Serial No. 338,623.

*To all whom it may concern:*

Be it known that I, JAMES H. COLLINS, a citizen of the United States, residing at Chicago, in the county of Cook and State of Illinois, have invented a new and useful Improvement in Eyeglasses, of which the following is a specification.

My primary object is to provide a pair of eye-glasses of an improved construction in which the lenses may be maintained at all times, when in use, in the proper horizontal and vertical planes, relative to the eyes of the wearer, and in which the pressure of the nose-guards may be readily controlled by the wearer, thereby adapting the eye-glasses to be securely and comfortably seated upon the nose.

In carrying out my invention I provide a connecting bar supporting the lenses and nose-guards, the nose-guards being relatively movable on said bar, whereby their extent of separation and therefore their pressure may be positively regulated, when applied to a nose.

In the accompanying drawing, which shows some of the forms in which my invention may be embodied—Figure 1 is a view in perspective of a construction of eye-glasses showing one desirable embodiment of my invention; Figs. 2, 3 and 4, broken plan views of other desirable embodiments; and Fig. 5, a perspective view of still another embodiment.

Referring to Fig. 1, 6 and 7 denote the lenses of the eye-glasses, the lens 6 being rigidly secured to a comparatively stiff friction-bar 8. Secured to the bar 8, near the lens 6, is a nose-guard 9 comprising a yielding arm 10 carrying at its outer end a blade or nose-pad 11. Slidably mounted on the opposite end of the bar 8 is a friction-sleeve 12 from which extends the nose-guard 13, likewise composed of a yielding arm 14 and a blade or nose-pad 15. The bar 8 has a perforated extension 16 to which the lens 6 is fastened in a common manner, and the sleeve 12 has a similar extension 16 to which the companion lens 7 is secured to move with the sleeve 12 and nose-guard 13. To apply the glasses to the nose, the lenses may be grasped at their edges between the fingers and the lenses pushed toward each other, thereby sliding the sleeve 12 upon the bar 8 until the guards engage the nose with desired pressure. The lenses may then be released, whereupon the pressure of the nose against the guards causes the sleeve 12, by slight change in angle, to frictionally grip the bar 8, thereby securely holding the guard 13 in its adjusted position relative to the nose-guard 9.

In the construction shown in Fig. 2, the lens 7 is mounted on the sleeve 12 in the manner shown in Fig. 1, but instead of mounting the lens 6 directly on the bar 8 it is mounted the same as the lens 7 on a friction-sleeve 17 carrying the nose-guard 9. In this construction, the bar 8 is not rigidly connected with the lenses or nose-guards, but serves merely as a slide bearing for the sleeves 12 and 17. The operation of this construction is the same as that of the construction shown in Fig. 1, excepting that both sleeves and therefore both guards may move on the bar 8 and both sleeves grip the bar, instead of one, as shown in Fig. 1.

In the construction shown in Fig. 3, the bar 8 has rigidly secured to it at one end the lens 6 and nose-guard 9, and is provided with serrations 18 along one edge. Slidably mounted on the bar 8 is a loose fitting sleeve 19 carrying the nose-guard 13 and a short arm 20 at the outer end of which is secured the lens 7. The arm 20, intermediate its ends, carries the tooth 21 which normally engages the serrations 18 for holding the sleeve 19 and nose-guard 13 in adjusted position on the bar 8 relative to the nose-guard 9. The glasses are applied to the nose by pressing the lenses together, thereby causing the sleeve 19 to slide on the bar 8 and the tooth 21 over the serrations 18. When the guards are brought sufficiently close together the pressure of the nose against the guards causes the tooth 21 to engage the serrations with the result of releasably locking the guard 13 in adjusted position relative to the guard 9.

In the construction shown in Fig. 4, the bar 8 is serrated throughout its length along one side and is separate from the lenses as in the case of the bar illustrated in Fig. 2. Slidably mounted on opposite ends of the bar 8 are loose fitting sleeves 19, each having an arm 20 extending from it to which the lenses 6 and 7 are attached. Each arm 20, intermediate its ends, is provided with a tooth 21 which normally engages the adjacent serrations on the bar 8. To each arm 20 is pivoted a spring nose-guard arm 22 terminating in a nose-pad 23. Each arm 22 extends through an opening (not shown)

in the arm 20 and is held in place by collars 24, 24, the inner end of each arm 22 being provided with a head 25 which normally presses against the serrations on the bar 8. In this construction the adjustment may be effected by moving both sleeves 19 on the bar 8 and the adjusted position of the guards is maintained by the pressure of the tooth 21 against the serrations as in the case of the sleeve 19, shown in Fig. 3. In applying the glasses to the nose the pivotal connection of the guards with the arm 20 allows them to turn and thereby to be adjusted to the nose. When so adjusted the pressure of the heads 25 against the serrated edge of the bar 8 maintains the guards in their pivotally adjusted positions.

In the construction shown in Fig. 5, the bar 8 is formed in two sections 26 and 27 slidable on each other. The section 26 has rigidly secured to it at its outer end the nose-guard 9 and lens 6, and the bar-section 27 likewise has secured to it at its outer end the lens 7 and guard 13. The inner end of the bar-section 27 carries a sleeve 28 through which the bar-section 26 extends, thereby affording a sliding connecting means for the sections. The top side of the section 27 is serrated and is normally engaged by a tooth 29 carried on the inner end of the section 26. The glasses are adjusted to the nose by flexing the bar 8 downwardly at its outer ends, thereby freeing the tooth 29 from the serrations on the section 27 and allowing the sections carrying the nose guards and lenses to be moved one on the other. When the proper adjustment is effected the lenses are released and the bar 8 springs back to its normal condition in which the tooth 29 engages the serrations and holds the guards and lenses in positively adjusted position relative to each other.

Other desirable forms embodying my invention may be constructed. For example, the lenses 6 and 7 instead of either one or both being movable on the bar as shown in some of the forms illustrated, may be rigidly secured to it at its opposite ends as is the case with the lens 6 (Fig. 1) and the relative adjustment of the guards may then be effected by the movement of the guards on the bar.

It will thus be noted that in each construction shown and described the lenses are caused to be maintained in the same relative planes, axes and inclinations after being applied to the nose as they were before being applied, and are so maintained regardless of the extent of movement of the guards on the bar. This permits the glasses to be applied to a nose of any size or shape and maintained thereon in proper alinement and at the proper distance from the eyes, a characteristic not found in any other glasses of which I am aware. This also allows the wearer to regulate the pressure of the guards against the nose, with the result of securely seating the glasses upon the nose.

Each of the constructions shown and described employs a connecting bar for the lenses and nose-guards, the nose-guards being relatively movable on said bar, whereby the gripping movement of the nose-guards and consequently their pressure against a nose may be positively regulated. In the case of each form illustrated, the nose-guards are held in adjusted position without the use of pivotal spring connection between the lenses, by the means for regulating the nose-gripping pressure of the guards, the means consisting, in the construction shown in Figs. 1 and 2, of the friction-collars, and in the construction shown in the remaining figures, of the ratchet mechanism illustrated.

What I claim as new, and desire to secure by Letters Patent, is—

1. In eye-glasses, the combination of a rigid bar, lenses and nose-guards supported by the bar and constructed and arranged to permit the distance between the guards to be increased and diminished by manual movement of either or both of the guards on the bar without changing the alinement of the lenses, and automatically-operating means constructed and arranged to cause the guards to be releasably held in adjusted position upon releasing them from said manual movement.

2. In eye-glasses, the combination of a rigid bar, lenses and nose-guards supported by the bar constructed and arranged to permit the distance between the guards and the distance between the lenses to be increased and diminished by manual movement of either or both of the guards and lenses without changing the alinement of the lenses, and automatically-operating means constructed and arranged to cause the guards and lenses to be releasably held in adjusted position upon releasing them from said manual movement.

3. In eye-glasses, the combination of a rigid bar, a lens and a nose-guard rigid on said bar, and a companion lens and nose-guard movable together on said bar to permit the distance between the guards and the distance between the lenses to be increased and diminished by manual movement of either or both of the guards and lenses without changing the alinement of the lenses, and automatically-operating means on said movable nose-guard constructed and arranged to cause the movable guard to be releasably held in adjusted position upon releasing it from said manual movement.

4. In eye-glasses, the combination of a rigid bar, a lens and nose-guard rigid on said bar, a friction sleeve adjustable on said bar and constructed and arranged to grip the bar when the sleeve is deflected, and a companion lens and nose-guard carried by said sleeve, whereby the movable nose-guard is frictionally held in adjusted position relative to its companion guard on the bar when the nose-guards grip the nose.

5. In eye-glasses, the combination of a rigid bar, lenses and nose-guards supported by the bar, the nose-guards each comprising a spring-arm and a pad on its free end, said nose-guards being supported at their spring-arms between the lenses on said bar and movable one with relation to the other to permit the distance between the guards to be increased and diminished by manual movement of either or both of the guards without changing the alinement of the lenses, and automatically-operating means constructed and arranged to cause the guards to be releasably held in adjusted position upon releasing them from said manual movement.

JAMES H. COLLINS.

In presence of—
W. B. DAVIES,
C. W. WASHBURNE.